(12) United States Patent
Lehmann et al.

(10) Patent No.: US 10,723,033 B2
(45) Date of Patent: Jul. 28, 2020

(54) SHEET MATERIAL AND PUNCHING TAPE CONTAINING SAME

(71) Applicant: Habasit AG, Reinach (CH)

(72) Inventors: Andreas Lehmann, Basel (CH); Roland Tröesch, Weil am Rhein (DE); Michael Tyler, Harrogate (GB); Markus Niederberger, Rheinfelden (CH); Anton Heimen, Wittinsburg (CH); Brent Whitehead, Lancashire (GB); Marshall Wright, Ljung (SE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 16/061,949

(22) PCT Filed: Dec. 14, 2016

(86) PCT No.: PCT/EP2016/080863
§ 371 (c)(1),
(2) Date: Jun. 13, 2018

(87) PCT Pub. No.: WO2017/102768
PCT Pub. Date: Jun. 22, 2017

(65) Prior Publication Data
US 2018/0370063 A1    Dec. 27, 2018

(30) Foreign Application Priority Data
Dec. 14, 2015    (EP) .................................... 15199830

(51) Int. Cl.
*B26F 1/02*        (2006.01)
*B32B 5/02*        (2006.01)
(Continued)

(52) U.S. Cl.
CPC .................. *B26F 1/02* (2013.01); *B26F 1/22* (2013.01); *B26F 1/44* (2013.01); *B29C 70/30* (2013.01);
(Continued)

(58) Field of Classification Search
CPC ...... B26F 1/02; B26F 1/22; B26F 1/44; B26F 2001/4436; B26F 2001/4445;
(Continued)

(56) References Cited

U.S. PATENT DOCUMENTS

| 3,719,113 A | 3/1973 | Gerber et al. |
| 4,192,494 A | 3/1980 | Mima |
| 5,165,990 A | 11/1992 | Nakano |

FOREIGN PATENT DOCUMENTS

| GB | 1311622 A | 3/1973 |
| WO | 2007/025782 A1 | 3/2007 |
| WO | 2015/173180 A1 | 11/2015 |

OTHER PUBLICATIONS

Li, J., Handbook of Plastics Industry Polyurethane, Chemical Industry Press, Jul. 1997, 1st Edition, 7 pages.

*Primary Examiner* — Camie S Thompson
(74) *Attorney, Agent, or Firm* — Hodgson Russ LLP (57) ABSTRACT

A sheet material (1) consisting of an mixture consisting essentially of: a) 10-50 percent by weight of random-oriented fibres, and; b) 90-50 percent by weight of a thermoplastic or thermoplastic elastomer; the weight percentages being based on the overall homogeneous mixture; and the sheet material having at room temperature a Shore D hardness of 40 to 85, preferably of 40 to 60, more preferably of 45 to 55. The sheet material (1) is used as a support in punching applications or as the top layer in punching belts (2).

15 Claims, 2 Drawing Sheets

(51) Int. Cl.
  *B32B 5/26* (2006.01)
  *B26F 1/22* (2006.01)
  *B29C 70/54* (2006.01)
  *B26F 1/44* (2006.01)
  *B32B 38/00* (2006.01)
  *B32B 38/04* (2006.01)
  *B32B 27/12* (2006.01)
  *B29C 70/30* (2006.01)
  *B32B 27/30* (2006.01)
  *B32B 37/06* (2006.01)

(52) U.S. Cl.
  CPC ............ *B29C 70/545* (2013.01); *B32B 5/022* (2013.01); *B32B 5/26* (2013.01); *B32B 27/12* (2013.01); *B32B 27/304* (2013.01); *B32B 37/06* (2013.01); *B32B 38/0004* (2013.01); *B32B 38/04* (2013.01); *B26F 2001/4436* (2013.01); *B26F 2001/4445* (2013.01); *B26F 2001/4481* (2013.01); *B26F 2210/00* (2013.01); *B26F 2210/02* (2013.01); *B32B 2038/042* (2013.01); *B32B 2250/02* (2013.01); *B32B 2250/40* (2013.01); *B32B 2260/023* (2013.01); *B32B 2260/046* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/04* (2013.01); *B32B 2262/06* (2013.01); *B32B 2262/065* (2013.01); *B32B 2262/08* (2013.01); *B32B 2262/10* (2013.01); *B32B 2262/101* (2013.01); *B32B 2262/103* (2013.01); *B32B 2262/106* (2013.01); *B32B 2262/12* (2013.01); *B32B 2274/00* (2013.01); *B32B 2307/536* (2013.01); *B32B 2605/00* (2013.01)

(58) Field of Classification Search
  CPC .......... B26F 2001/4481; B26F 2210/00; B26F 2210/02; B29C 70/30; B29C 70/545; B29C 70/12; B29C 70/40; B32B 2038/042; B32B 2250/02; B32B 2250/40; B32B 2250/03; B32B 2260/024; B32B 2260/046; B32B 2262/0246; B32B 2262/0253; B32B 2262/0261; B32B 2262/0269; B32B 2262/0276; B32B 2262/0284; B32B 2262/04; B32B 2262/06; B32B 2262/065; B32B 2262/08; B32B 2262/10; B32B 2262/101; B32B 2262/103; B32B 2262/106; B32B 2262/12; B32B 2307/536; B32B 2605/00; B32B 38/0004; B32B 38/04; B32B 2327/06; B26D 7/20; C08K 7/02; C08L 25/04; B29K 2025/00; D04H 1/4209; D04H 1/4266; D04H 1/4342; H05K 1/0366; Y10S 83/941; Y10T 83/0605; Y10T 83/303; Y10T 83/9309; Y10T 428/24355; Y10T 428/2495; Y10T 428/24983; Y10T 428/24994
  USPC .......... 269/289 R; 428/141, 213, 217, 297.4; 442/136; 83/174, 56, 658, 941
  See application file for complete search history.

SHEET MATERIAL AND PUNCHING TAPE CONTAINING SAME

DECLARATION UNDER RULE 4.18 PCT

The present application claims the priority of European patent application No. 15199830.9. For the purposes of rule 20.5 PCT the entire content of this priority application shall be included by reference into the present application.

FIELD OF THE INVENTION

The present invention relates to a sheet material which is suitable as a support in the stamping of sheet-like goods, and is suitable as a punching tape or as the conveying and working layer in such punching tape, and which is also suitable as a cut-resistant support in other cutting applications.

BACKGROUND ART

In punching or stamping apparatuses a conveyor belt is used to convey the sheet-like good to be stamped to the stamping blade. The conveyor belt simultaneously also serves as the support or anvil during the stamping or punching of the sheet-like good or sheet material. Such conveyor belt is commonly designated as a "punching tape". Such punching tape generally is shaped with the same components as an ordinary conveyor belt, but wherein the cover layer, acting as the support or anvil during the stamping or punching, is made of a highly wear-resistant material, usually polyurethane.

Figure 2:
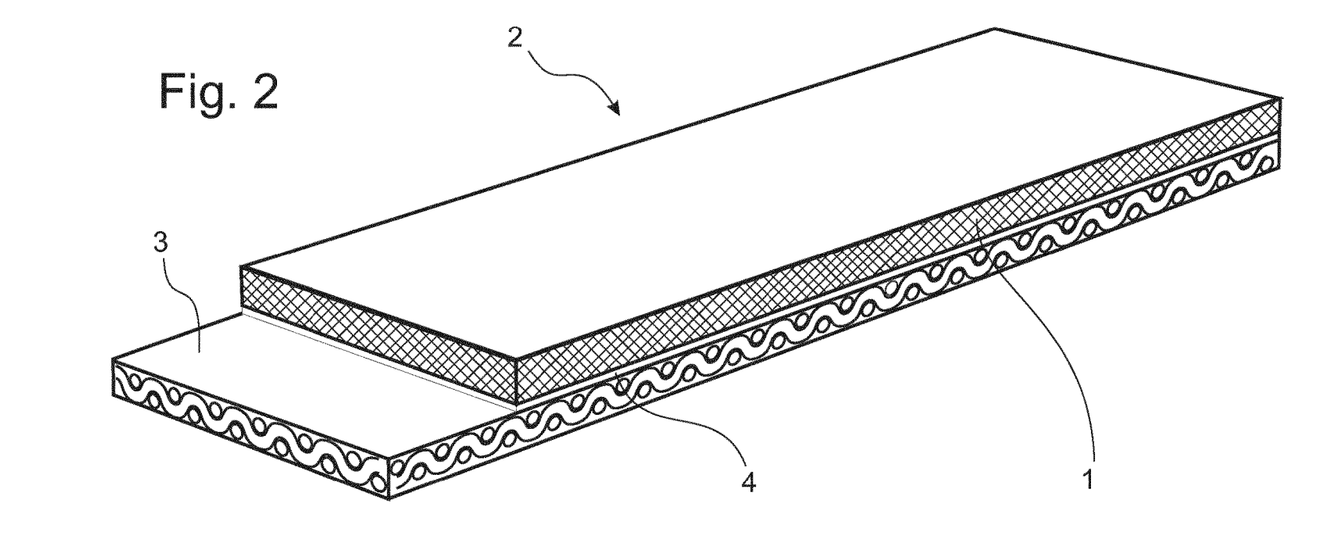
FIG. 2 shows a perspective view of a punching tape of the invention.

GB 1 311 622 discloses an apparatus for punching blanks using a punching belt constructed of three superposed layers of fabric and a coating of a wear-resistant material, such as nylon of a thickness of 3 mm, provided on the outer surface of the belt. These fabrics would have been understood by the skilled person as "woven" fabrics: FIG. 2 shows cross-sections of weft filaments in "fabrics 19 and 21" and cross-sections of warp filaments in "fabric 20".

U.S. Pat. No. 5,699,707 discloses a cutting machine for cutting soft sheet material, comprising an endless microporous support belt 56 which overlies an endless endless conveyor 36 and which is made either of microporous sintered plastic beads or of a Fourdrinier cellulosic web saturated with latex. If the micro-porous support belt is made from sintered plastic beads it is devoid of any fibres. On the other hand, if it is made from a latex-saturated Fourdrinier cellulosic web, then the predominant component therein, such as 80-95 percent by weight, are cellulosic fibres, and the latex is a rubbery, thus crosslinked plastic.

GB 2 458 687 describes a rotary perforator or cutter for cutting or perforating paper. A rotating cylinder with perforating edges acts during cutting against an "anvil belt" which has a resilient surface which may e.g. be made of polyurethane, i.e. it is devoid of any fibers.

U.S. Pat. No. 6,233,989 describes an apparatus for stamping a metal sheet having a cushioning pad which is located between a supporting die and the metal sheet to be stamped. The cushioning pad is made of a compressible material. e.g. of vegetable or polymeric fibres, such as polyester, aramid and paper fibres being bound with a binder which may be a "nitrile" (i.e. nitrile rubber), "neoprene" (i.e. chloroprene rubber) or "SBR" (i.e. styrene-butadiene-rubber) binder, thus a crosslinked rubber. The stamping may be carried out either with cutting into the cushioning pad, or without cutting into the cushioning pad if an uncut pad is required for reuse.

U.S. Pat. No. 4,419,913 discloses a method and apparatus for cutting patterns in web material, wherein the web of pattern material rests upon a corresponding web of flexible material with a rough surface, such as a fleece, which permits passage of air and has vertical resilience. This web of flexible material is seemingly a neat fleece devoid of any plastic matrix.

The applicant marketed at the time of filing of this application belts comprising a traction layer and one or two impregnated nonwoven fabrics. An example of such belts had the type code UM220SC-B. This belt was indicated as suitable, among others, as a punching or stamping belt. The two impregnated nonwoven fabrics contain as the predominant component the fibres. Dedicated punching belts marketed by the applicant with type codes XVT-2197 and XVT-2249 on the other hand contained an impregnated woven polyamide fabric.

US 2004/168757 describes a monolithic belt of a thermoplastic material to which optionally elongated or fibre-formed additive materials, in unknown amounts, may be added to increase strength.

EP 0 638 414 mentions a process for the preparation of a thermoplastic substrate, in which an aqueous slurry of heat-fusible polymer particulates and reinforcing fibres is formed, the slurry is dewatered to form a dewatered mat, such as on a paper making machine, the dewatered mat is dried and then heat and pressure is applied to the dried mat to melt the thermoplastic resin. The amount of polymers in the composite substrate is 20-90%, preferably 30-70%. The amount of reinforcing material is generally 10-80% and preferably 30-70%.

Hard sheet materials consisting of a fibre-reinforced layer of a thermoplastic, customarily designated as "stampable sheets", have been used for stamping and molding car parts in the automotive industry or printed circuit boards in the electronics industry. The molding and stamping are done at elevated temperature. For a description of such stampable sheets and their applications reference is made, by way of example, to U.S. Pat. No. 5,165,990.

U.S. Pat. No. 5,316,834 describes a two layered stampable sheet, consisting of a first layer of thermoplastic-impregnated woven or knitted fabric and a second layer of thermoplastic-impregnated nonwoven fabric. The fibres in the nonwoven fabric of the second layer are substantially uniformly distributed and the nonwoven fabric may be further needled, and may be e.g. a web of crimped meta-type aramid fibre to which a water jet needling has been applied. This stampable sheet can be molded at 250-300° C. into articles such as cylinders.

The present invention seeks to provide an improved sheet material suitable in a punching tape of the aforementioned type.

SUMMARY OF THE INVENTION

The invention thus provides:
1. A sheet material consisting of a mixture consisting essentially of:
   a) 10-50 percent by weight of random-oriented fibres, and
   b) 90-50 percent by weight of a thermoplastic or thermoplastic elastomer;

the weight percentages being based on the mixture; and the sheet material having a Shore D hardness of 40 to 85, preferably of 40 to 60, more preferably of 45 to 55, at room temperature.
2. The sheet material of above [1], characterised in that in the mixture the fibres a) are uniformly distributed through the thermoplastic or thermoplastic elastomer b).
3. The sheet material of above [1] or [2], characterised in that it has a residual gas content of essentially zero.
4. The sheet material of one of above [1] to [3], characterised in that the fibres a) are organic fibres.
5. The sheet material of above [4], characterised in that the organic fibres are natural fibres.
6. The sheet material of above [5], characterised in that the natural fibres are vegetal fibres selected from the group consisting of cellulose, hemp, flax, ramie, sisal, cotton and jute; or are animal fibres selected from the group consisting of wool and silk.
7. The sheet material of above [4], characterised in that the organic fibres are synthetic fibres selected from the group consisting of polyesters, polyamides, polyacrylnitrile; polyolefinic fibres, aramid and synthetic cellulose derivatives, or are bicomponent fibres.
8. The sheet material of above [7], characterised in that the synthetic fibres are of PET, PBT, nylon, polyacrylnitrile, aramid, polyethylene or polypropylene, or are bicomponent fibres.
9. The sheet material of one of above [1] to [3], characterised in that the fibres are inorganic fibres selected from the group consisting of glass, asbestos and carbon, or are metal fibres.
10. The sheet material of one of above [1] to [9], characterised in that the length of the fibres is in the range of 15 to 150 mm.
11. The sheet of one of above [1] to [10], characterised in that the mixture contains 50 to 90 percent by weight of a thermoplastic or thermoplastic selected from the group consisting of i) styrenic block copolymers, ii) thermoplastic (co)polyolefins and blends thereof, iii) elastomeric alloys, iv) thermoplastic polyurethanes, v) thermoplastic copolyesters and vi) thermoplastic polyamides.
12. The sheet material of above [11], characterised in that the thermoplastic is PVC or the thermoplastic elastomer is TPU.
13. A process for the manufacture of the sheet material of above [1], comprising the steps of
i) providing two layered composites, each layered composite comprising or consisting of a top layer consisting of a pre-assembled sheet-like fibre layer with random orientation of the fibres, a bottom layer consisting of a sheet of a thermoplastic or thermoplastic elastomer, and an optional intermediate layer consisting of the fibres of the top layer impregnated with the thermoplastic or thermoplastic elastomer of the bottom layer; wherein the thermoplastic or thermoplastic elastomer in the bottom layer and in the optional intermediate layer makes up 90-50 percent by weight of the layered composite; and the fibres of the top layer and in the optional intermediate layer together make up 10-50 percent by weight of the layered composite;
ii) stacking the two layered composites atop of each other such that their bottom layers contact each other and their top layers face away from each other; and
iii) bonding the two layered composites together by heat and pressure at a temperature at which the thermoplastic or thermoplastic elastomer melts and penetrates into the two top layers, to form the sheet material of the invention.
14. A punching tape comprising a sheet material as defined in one of above [1] to [12], and a traction layer.
15. A process for punching or cutting a section out of a sheet-like workpiece, comprising the steps of
a) arranging the sheetlike workpiece on a sheet material according to one of above [1] to [12], or on the sheet material as the top layer of a punching tape according to above [14]; such that the sheet material or the punching tape acts as a support for the sheetlike workpiece; and
b1) punching the section out of the sheetlike workpiece using a punch, or
b2) cutting the section out of the sheet-like workpiece using a knife or blade.

DETAILED DESCRIPTION OF THE INVENTION

It has unexpectedly been found that by use of random-oriented fibres as a reinforcement in a sheet material made mainly of a thermoplastic or thermoplastic elastomer, the suitability of such sheet material as a support in punching applications or as a topmost layer in a punching tape can be advantageously influenced and the service life of such sheet material or punching tape can be increased.

The sheet material of the invention consists of a mixture "consisting essentially" of the components a) and b). "Consisting essentially" means in the context of the present invention that other unnamed components make up at the most 1 percent by weight of the mixture, and with the proviso that the sum of components a), b) and the at the most 1% of other unnamed components adds up to 100 percent by weight. Any plasticizers, dyes or colorants contained in the thermoplastic or thermoplastic elastomer b) shall be considered as forming part of the weight amount of that thermoplastic or thermoplastic elastomer b), not of the at the most 1% unnamed components mentioned above.

A first essential feature of the invention is that the fibres as component b) are required to be "random-oriented", meaning that they have a predominantly, or nearly complete, random orientation in all three dimensions of the sheet material (wherein e.g. the length and width thereof may be designatable as x and y dimensions; and the direction perpendicular to the surface of the sheet material may be designated as z dimension).

A second essential feature of the invention are the amounts of fibres a) and thermoplastic or thermoplastic elastomer b) in the mixture. The amounts of thermoplastic or thermoplastic elastomer may be determined on the sheet material of the invention by firstly milling a representative sample thereof to a powder of particle size sufficiently small that no fibres remain completely embedded in a particle. If the sheet of the invention forms the top layer of a punching tape of the invention, comprising further layers, then a representative sample of the sheet material may be obtained by chamfering that top layer from the punching tape before milling to a powder. Preferably the representative sample is milled down to a particle size generally smaller than the half-diametre (or radius) of the fibres. The powder so obtained is then treated with an inert solvent not dissolving neither the thermoplastic or thermoplastic elastomer nor the fibre material, such as a hydrocarbon solvent. The solvent treatment may preferably be accompanied by heat and/or ultrasound. Alternatively the powder is treated with hot steam, such as at 100-120° C., at elevated pressure, as described in JP 2002-307046. The treatment shall break apart any fibre fragments from any fragments of thermoplastic or thermoplastic elastomer. This breaking apart is generally possible since in the sheet material of the invention there is essentially no chemical bonding between thermoplastic or thermoplastic elastomer and fibres, and because the thermoplastic or thermoplastic elastomer is normally chemically incompatible with the material of the fibres. After such treatment the segregated particles of thermoplastic or thermoplastic elastomer and the segregated particles of fibre material may be separated by physical means, e.g. based on differences in density, such as centrifugation, sedimentation or flotation; collected; dried and weighed; to give quantitatively the weight amounts of thermoplastic or thermoplastic elastomer and of each type of fibre material initially present in the representative sample of sheet material of the invention.

Based on such absolute weight amounts both the relative amounts of the components based on the weight of the representative sample and the weights of the components per unit of surface of the sheet material can be calculated.

The thickness D of the sheet material of the invention is preferably in the range of 0.3 to 5 mm, more preferably in the range of 0.4 to 2 mm.

In the context of the present invention the thickness D of any geometrically well-defined sheet or layer (which includes the sheet material of the invention and e.g. any sheet of thermoplastic or thermoplastic elastomer that may be used as starting material in its manufacture) is directly measured on that sheet or layer and is then designated as $D_m$.

If the sheet material of the invention contains essentially no other unnamed components, besides a) and b), then its thickness D can be calculated using parametres of the starting materials. D is then designated as $D_c$ and is calculable (in m), as follows:

$$D_c = \frac{V}{A} = \frac{V_T + V_F}{A} = \sum_{k=1}^{K}(D_m)_k + \frac{V_F}{A} = \sum_{k=1}^{K}(D_m)_k + \left(\sum_{n=1}^{N}\left(\frac{m_n}{\rho_n}\right)\right)/A \quad (1)$$

$$= \sum_{k=1}^{K}(D_m)_k + \sum_{n=1}^{N}\left(\frac{W_n}{\rho_n}\right)$$

wherein
V/A is the finished sheet material's volume, per unit of its surface (in $m^3/m^2$);
$V_T/A$ is the volume of all thermoplastic or thermoplastic elastomer used in the manufacture of the sheet material, per unit of its surface (in $m^3/m^2$);
$(D_m)_k$ is the thickness (in m) of the k-th geometrically well defined sheet of thermoplastic or thermoplastic elastomer; if the thermoplastic or thermoplastic elastomer is employed in the manufacture of the sheet material of the invention as a plurality of such geometrically well defined sheets; and the sum runs over all K such sheets;
$V_F/A$ is the total volume of all fibres used in the manufacture sheet material surface, per unit of its surface (in $m^3/m^2$);
$m_n/A = W_n$ is either the weight of the n-th type of fibres used in the manufacture sheet material surface, per unit of its surface, and the sum runs over all N used types of fibres (in $g/m^2$); or, if the fibres are used as a plurality of pre-assembled sheet-like layers of fibres (such as non woven fabrics), is the weight per unit surface of the n-th such pre-assembled sheet, and the sum runs over all N used pre-assembled sheets (in $g/m^2$); and
$\rho_n$ is the density of the n-th type of used fibres (in $g/m^3$).

In the context of the present invention the thickness D of any easily compressible layer, such as an abovementioned pre-assembled sheet-like layer of fibres, more particularly in the form of a non-woven fabric, is directly measured on that sheet-like layer or non-woven fabric under a defined pressure of 0.2 bar, exerted perpendicularly onto the surface of the sheet-like layer or non-woven fabric. This pressure may e.g. be exerted by the measuring gauge itself or by an additional die that compresses the sheet-like layer or non-woven fabric. A geometric thickness measured under such 0.2 bar pressure is designated in the following as $D_{mp}$.

In the context of the present invention the thickness D of any other geometrically not well-defined and essentially incompressible sheet or layer, such as for instance, a woven fabric used as a traction layer in the punching belt of the invention, may be approximated as $D_a$ (in m) using the following formula $$D_a = \frac{W}{\rho} \quad (2)$$

wherein
W is the weight per unit area (in $g/m^2$) of a representative sample of the sheet material or layer, and
$\rho$ is the average density (in $g/m^3$) of that representative sample,
or, alternatively, be directly measured under 0.2 bar pressure as outlined above.

A first preferred feature for the sheet material of the invention is that the fibres a) be as uniformly as possible distributed throughout the matrix of thermoplastic or thermoplastic elastomer. Such uniformity is for the purposes of the invention considered as given if in a cross-section of the sheet material, in any conceivable imaginary square area thereof having sides of a length L, there is always at least one fibre; wherein L is determined as $$L = d \times D_{mp} / \sum_{n=1}^{N}\left(\frac{W_n}{\rho_n}\right) \quad (3)$$

wherein d is the weight-averaged diameter of all n used fibre types (in m), $D_{mp}$ (in m) is as defined above, and $W_n$ (in $g/m^2$), $\rho_n$ (in $g/m^3$) and the sum are as defined for formula (1). The analysis of said cross-section of the sheet material may be done under a microscope at a magnification of typically 150 times to 600 times.

In the context of the invention a "representative sample" of a sheet or layer may typically have a geometric surface of not less than, or equal to, $0.25 \, m^2$.

A second preferred feature of the sheet material of the invention is that it has a residual gas content of essentially zero. Any significant gas content would cause the sheet material of the invention to swell, such that its measured thickness $D_m$ would become noticeably greater than the $D_c$ calculated by above formula (1).

For the purposes of the invention "essentially zero gas content" shall mean that $D_m$ is at the most 1.05 times $D_c$, preferably that $D_m$ is at the most 1.03 times $D_c$, more preferably that $D_m$ is at the most 1.01 times $D_c$. The amount of contained residual gas (in vol %) is calculable from these two parametres as follows:

$$\text{residual gas content (vol \%)} = \left(1 - \frac{D_c}{D_m}\right) \times 100 \quad (3)$$

The length of the fibres in the sheet material of the invention is preferably in the range of 15 to 150 mm, more preferably in the range of 30 to 100 mm. This means the individual length of each fibre, not an average length of all fibres. It is therefore intended that essentially all, i.e. at least 95%, of the fibre specimens have such length.

Exemplary fibre materials are inorganic or organic fibres.

Inorganic fibres may be selected from the group consisting of glass, asbestos, bitumen and carbon, or may be metal fibres, such as steel.

Organic fibres may be selected from the group consisting of natural or synthetic fibres. Natural fibres may be selected from vegetal fibres, such as cellulose, hemp, flax, ramie, sisal, cotton or jute; or from animal fibres, such as wool or silk. Synthetic fibres may be selected from the group consisting of polyesters, such as PET or PBT; polyamides, such as nylon; polyacrylnitrile; or polyolefinic fibres such as polypropylene or polyethylene; aramide; or synthetic cellulose derivatives such as viscose fibres. A further exemplary embodiment of synthetic fibres are bicomponent fibres having a higher-melting type of fibres and a lower-melting type of fibres, or core-sheath fibres having a higher-melting core and a lower-melting sheath.

The fibres have, when they are synthetic or inorganic, preferably a cylindrical shape with a diametre typically in the range of 10 to 100 micrometres.

The titer of the fibres is preferably in the range of 1 to 200 dtex, more preferably in the range of 5 to 100 dtex.

A most preferred embodiment for the fibres are cylindrical PET fibres with a length in the range of 50 mm-100 mm and a diametre of 15 µm to 50 micrometres.

The fibres are preferably pre-assembled, before incorporation into the sheet material of the invention, into a sheet-like layer, e.g. in the form of a non-woven fabric, in particular a staple non-woven or a spunlaid non-woven. Such pre-assembled sheet-like layer preferably has a weight per unit of surface area in the range of 80 to 6'000 grams per square metre, more preferred in the range of 200 to 1'000 grams per square metre.

In such a staple or spunlaid non-woven fabric it is particularly convenient to achieve the above-mentioned three dimensional random orientation of the fibres. Namely an initial essentially two-dimensional random orientation of the fibres in the said x and y dimensions is automatically achieved when the pre-assembled sheet-like layer material is made. Further fibres mainly oriented in the said z dimension may then be introduced into that pre-assembled sheet-like layer by a customary needle-punching or hydro-entanglement treatment (mechanical intertwining of fibres by water jets, also called "spunlace"), respectively. This gives the random orientation of the fibres into all three x, y and z dimensions. The above-mentioned preferred length ranges of the fibres apply mainly to the fibres oriented in the said x and y dimensions, whereas the later introduced fibres oriented mainly in the z dimension may be shorter.

In a preferred embodiment the fiber intersections in the sheet-like material are adhered to each other, in order to enhance the mechanical resistance of the sheet-like material. Such adhering may be done using one of the above exemplified thermoplastics or thermoplastic elastomers as hot-melt adhesive, using a calender or a heating oven. Alternatively, if the above mentioned bicomponent or core-sheath fibres are used, the low-melting fibre fraction or low-melting sheet, respectively, may serve as such hot-melt adhesive to adhere the fibre intersections together.

If both the material of the random oriented fibres a) and the thermoplastic or thermoplastic elastomer b) have defined melting points, then the material of the random oriented fibres a) preferably has a melting point at least 20° C. higher than the melting point of the thermoplastic or thermoplastic elastomer b). If the material of the random oriented fibres a) has a defined melting point but the thermoplastic or thermoplastic elastomer b) has a melting range, then the material of the random oriented fibres a) preferably has a melting point at least 20° C. higher than the upper boundary temperature value of the melting range of the thermoplastic or thermoplastic elastomer b). If both the material of the random oriented fibres a) and the thermoplastic or thermoplastic elastomer b) have melting ranges, then the lower boundary temperature value of the melting range of the material of the random oriented fibres a) is preferably at least 20° C. higher than the upper boundary temperature value of the melting range of the thermoplastic or thermoplastic elastomer b). As the "lower boundary temperature value" and "higher boundary temperature value" of a melting range are understood the temperature at which the material just starts to melt and the temperature at which the material has just completely melted, respectively.

Preferably in all three situations described in the preceding paragraph, the temperature difference is more preferably at least 30° C. and still more preferably at least 40° C.

The finished overall sheet material of the invention has, as a third essential feature, a Shore D hardness in the range of 40 to 85, preferably in the range of 40 to 60 and more preferably in the range of 45 to 55. The Shore D hardness is measured at room temperature, i.e. at 25° C.

Exemplary materials for the thermoplastic or thermoplastic elastomer b) may be selected from one of the customarily known subgroups i) styrenic block copolymers (TPE-s), ii) thermoplastic (co)polyolefins and blends thereof (TPO), iii) elastomeric alloys (TPE-v or TPV), iv) thermoplastic polyurethanes (TPU), v) thermoplastic copolyesters and vi) thermoplastic polyamides.

More preferred are on the one hand TPU's, in particular those made of 1) hard segments obtained by reacting aromatic diisocyanates (such as isomeric 2,2'-, 2,4' or 4,4'-diphenylmethane diisocyanate) with aliphatic chain extenders (e.g. $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine) and 2) aliphatic polyester polyols or polyether polyols as soft segments.

More preferred are on the other hand TPO's selected from the group consisting of ii-1) homo- and copolymers of vinylic monomers of the structure $XHC=CH_2$, wherein X is selected from the group consisting of chloro, acetoxy, phenyl and cyano, and the copolymerised monomer (for copolymers) is ethylene and/or propene; and ii-2) ethylene-alpha-olefin copolymers, wherein the alpha-olefin is preferably selected from the group consisting of propene, 1-butene, 1-hexene, 1-heptene and 1-octene. Most preferred among the TPO's are homopolymers of $ClHC=CH_2$ (=PVC), copolymers of $CH_3COHC=CH_2$ and ethylene (=EVA) and ethylene-1-octene copolymers.

It is preferred that the matrix forming the sheet material of the invention contains only one type of thermoplastic, or contains only one type of thermoplastic elastomer.

Most preferred the thermoplastic is PVC, or the thermoplastic elastomer is TPU.

The thermoplastic or thermoplastic elastomer used as starting material preferably has a Shore A hardness in the range of 85 to 100, more preferably of 85 to 95. The flexibility and/or softness of the thermoplastic or thermoplastic elastomer may have been enhanced beforehand by adding a customary and compatible plasticizer.

In order to obtain a sheet material with both the said preferred uniform distribution of the fibres and the said preferred absence of residual gas a new process for its manufacture has been developed. This inventive process comprises the steps i), ii) and iii) outlined in the summary of the invention.

The two layered composites provided in step i), each comprise a top layer consisting of fibres, preferably derived from of a pre-assembled sheet-like fibre layer with random orientation of the fibres, and a bottom layer of a thermoplastic or thermoplastic elastomer. Top layer and bottom layer are in direct contact with each other, except for the optional intermediacy of a thin intermediate layer consisting of the fibres as found in the top layer and of the thermoplastic or thermoplastic elastomer as found in the bottom layer and having penetrated into the said fibres. The two layered composites are identical to each other concerning the type of sheet-like fibre layer and concerning the type of the layer of thermoplastic or thermoplastic elastomer they contain. More preferably they are also identical concerning the thicknesses $D_m$ and $D_{mp}$ of thermoplastic or thermoplastic elastomer layer and pre-assembled sheet-like fibre layer, respectively. Still more preferably they are also identical concerning their length (x direction) and width (y direction). Most preferably the two layered composites are identical to each other in every respect.

The stacking of the two layered composites of step ii) atop of each other is done in such a way that their layers of thermoplastic or thermoplastic elastomer contact each other, without the intermediacy of any air gap or other layer.

The bonding the two layered composites together by heat and pressure causes the thermoplastic or thermoplastic elastomer to soften and melt, to completely penetrate into the sheet-like two fibre layers, to bond the two layered composites together and to thus form the sheet material of the invention.

The bonding together by heat and pressure of step iii) may be effected by calenders, hot presses or a so-called "Rotocure". The latter is a continuously working device consisting of a heated roll with a continuous belt around it, which presses the sheets to be bonded together to the heated roll. An example of a commercially available Rotocure unit are the "Rotocure AUMA" devices of Berstorff (Germany).

Step iii) is done at a temperature sufficiently high that the thermoplastic or thermoplastic elastomer melts, rather than simply softens as would be the case for an ordinary calendering process. Only if the thermoplastic or thermoplastic elastomer is essentially molten it has sufficiently low viscosity to penetrate all voids in the sheet-like layer of fibres and to form a sheet material of the invention having "essentially zero gas content" in the foregoing sense. "Essentially molten" may mean in the context of the invention that the melt has at the chosen temperature for step iii) a MFI at 8.7 kg of at least 20 g/10 min, preferably of at least 30 g/10 min, and most preferably 30 to 60 g/10 min. In each case this is with the proviso that the temperature is kept sufficiently low to avoid decomposition of the thermoplastic or thermoplastic elastomer.

Using a molten thermoplastic or thermoplastic elastomer, instead of an only softened one, necessitates the layer arrangement specified in step ii). Using an arrangement with only one sheet-like fibre layer and only one sheet of thermoplastic or thermoplastic elastomer, as in an ordinary calendering process, would cause the molten thermoplastic or thermoplastic elastomer to simply flow away from the calender instead of penetrating the sheet-like fibre layer.

On the other hand the fibres should not melt during process step iii). For this reason the above outlined temperature differences between melting point (or melting range) of fibres a) and melting point (or melting range) of thermoplastic or thermoplastic elastomer b) are preferable.

More preferably in step iii) the pressure is applied either by two calender rolls or by two press plates or by the belt and heating roll of a Rotocure, wherein the two calender rolls, the two press plates, or the belt and the heating roll of the Rotocure, respectively, are kept at a distance which is essentially equal to the distance $D_c$ calculated by above formula (1), using for the sums K=2 and N=2. This is because the first layered composite comprises a 1st sheet of thermoplastic or thermoplastic elastomer layer with thickness $(D_m)_1$ and a 1st sheet-like fibre layer with weight per unit area $W_1$ and (weight average) fiber material density $\rho_1$; and the second layered composite comprises a 2nd sheet of thermoplastic or thermoplastic elastomer layer with thickness $(D_m)_2$ and a 2nd sheet-like fibre layer with weight per unit area $W_2$ and (weight average) fiber material density $\rho_2$. By keeping such distance $D_c$ an essentially complete displacement of any gas contained in two layered composites by the softened or molten thermoplastic or thermoplastic elastomer can be achieved in step iii), such as to obtain an essentially gas-free sheet material of the invention with uniform distribution of the fibres.

The process of the invention furthermore preferably comprises the beforehand step of providing the layered composites needed for step i). For each of the layered composites one sheet of a thermoplastic is arranged atop of one pre-assembled sheet-like layer of fibres, e.g. in the form of a non-woven fabric (or vice versa), without the intermediacy of any other layers or materials. Optionally the two layers may be bonded together beforehand under heat and pressure, using apparatus as exemplified above for step iii) and furthermore optionally in such a way that some of the thermoplastic or thermoplastic elastomer penetrates to some extent into the pre-assembled sheet-like layer of fibres.

The sheet material of the invention is preferably used as a carrier substrate for a sheet-like workpiece to be punched, or in a punching tape, as described in the introduction. An exemplary punching tape of the invention comprises a sheet material of the invention and furthermore one traction layer comprising, or consisting of, a woven fabric. Sheet material of the invention and traction layer may have been directly adhered to each other, using only the thermoplastic or thermoplastic elastomer as hotmelt adhesive. Alternatively a thermosetting (crosslinking) adhesive such as polyurethane, rubber, rubber mixtures and phenol-formaldehyde resin, being compatible with the materials to be bonded together, i.e. with both the traction layer and sheet material, may be used. The punching tape may optionally comprise two or three traction layers which preferably also are woven fabrics. The weave of the traction layer(s) may be a plain weave or a twill weave. The material of the filaments therein may be any material customarily used in conveyor belt fabrics; preferably it is a polyester, more preferably it is PET.

The punching tape of the invention can be used in any device wherein punching, stamping or cutting of a sheetlike workpiece is performed, and wherein the punching tape serves both for conveying the sheetlike material and for supporting it during the punching, stamping or cutting operation. The punching, stamping or cutting device as such is conventional. In the inventive process the sheetlike workpiece can e.g. be a sheet metal, such as aluminum foil, or a plastics foil, or paper or cardboard. The thickness of the sheetlike workpiece is preferably in the range of 0.2 to 3 mm, wherein softer materials may allow greater thicknesses within that range. The inventive punching or cutting process is preferably run at room temperature or slightly near room temperature, such as at 15° C. to 35° C., preferably at 20° C. to 30° C. The inventive sheet material or punching tape may be supported during the punching or cutting operation on an immovable planar support or, in the case of the inventive punching tape, on a roll, in order to have more back-pressure during the punching or cutting action of the punch, knife or blade.

The sheet material and punching tape of the invention can be easily regenerated, once excessive damage is present on its surface. It is sufficient to uniformly heat the damaged surface, such as with an array of IR lamps, to soften up the thermoplastic or thermoplastic elastomeric material that is the main constituent up to nearly its melting point. Upon such softening up any cuts in the surface re-closen and any unevennesses flatten out again, with reforming of a clean, even and smooth surface. Such regeneration may be done in situ, thus without removing it from the punching apparatus. In the case of a punching tape of the invention such regeneration may be done while looping around the driving and idler rollers, as it would during the actual punching operation. In practice up to 30 such regeneration cycles have been successfully carried out until now, with the punching tape after the 30th regeneration cycle having within tolerance limits the same behaviour as a the original, unused punching tape. The typical lifetime of service of a punching tape of the invention with recycling as described above may be extended to 2-3 years of service, as compared to a lifetime of service of typically 6 to 12 months, under some circumstances only about 2 months, for a non-regenerable conventional punching tape. Furthermore one big advantage of the inventive punching tape compared to prior art punching tapes is that it allows end-joining of its open ends to form an endless tape with use of the so-called and well known "fingerend" end-joining technique. In this technique the ends of the not-yet endless tape are cut into a zig-zag of alternating teeth and recesses, in such a way that one tooth of one tape end can engage with one corresponding recess on the other tape end, and vice-versa. Such zig-zaged ends can be joined simply using hot presses, optionally with co-use of a hotmelt adhesive. Prior art punching tapes, such as made of polyamide or PCV, typically require gluing together of the ends, which is slower and less precise that the said fingerend technology.

In a similar way a sheet material of the invention may easily be repaired, if by accident a section thereof should have been entirely punched out: It is sufficient to re-insert the punched-out section into the mating hole in the sheet material and to weld the seam together, again using e.g. an array of IR lamps or other heat source, and by using the thermoplast or thermoplastic elastomer contained in the sheet material as the (sole) hotmelt adhesive.

The invention will now be further explained by the following examples and with reference to the figures.

EXAMPLES

Example 1: Manufacture of a Sheet Material of the Invention

Figure 1:
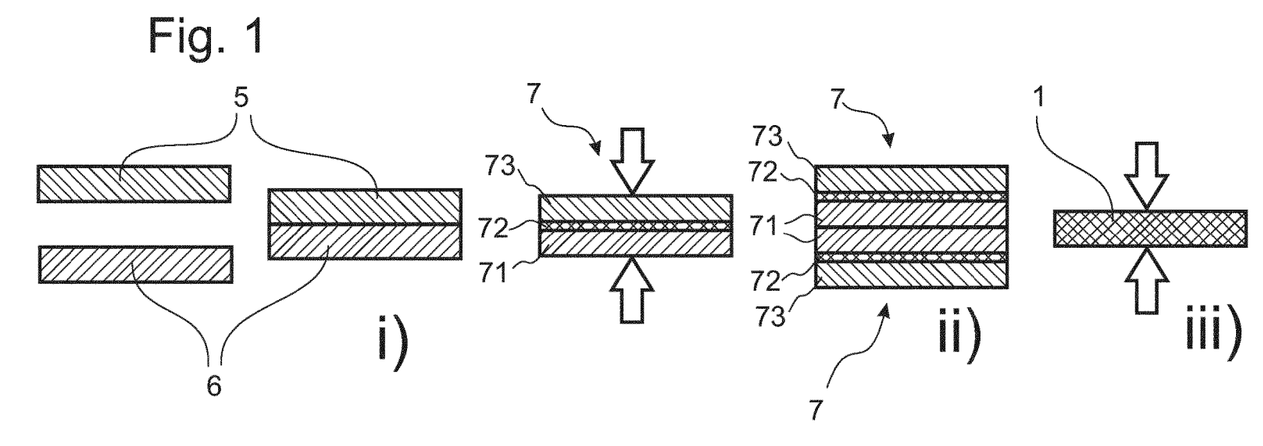
FIG. 1 shows a schematic view of a preferred production process for the sheet material of the invention.

Reference is made to FIG. 1.

A needled non-woven fabric 5 of PET fibres with a weight per unit area of 640 g per square metre and a thickness $D_{mp}$ of about 4.2 mm was provided. Similarly a geometrically well defined sheet 6 of TPU ("Estane" type, Lubrizol) of 1.6 m width and thickness $D_m$ of about 0.39 mm was provided. Non-woven fabric 5 and TPU sheet 6 were stacked atop of each other and were bonded together using a calender. A layered composite 7 was obtained, consisting of a top layer 73 (formed from the needled non-woven fabric 5), a bottom layer 71 (formed from the TPU layer) and a thin boundary layer 72 consisting of non-woven fabric impregnated with TPU.

The layered composite 7 so obtained was cut in half along a transversal axis, to provide two layered composites 7 being identical in every respect. The two composites were stacked atop of each other with their bottom layers 71 contacting each other and with their top layers 73 facing outwards to the environment and away from each other.

The double composite so obtained was passed through a Rotocure as described in the general description to bond the two bottom layers 71 together.

A distance $D_c$ between belt and heated roll of the Rotocure in this final step was calculated as follows:

$$D_c = 2\left(D_m + \frac{W}{\rho}\right) = 2\left(0.00039 \text{ m} + \frac{640 \text{ g/m}^2}{1\,380\,000 \text{ g/m}^3}\right) = 1.7 \text{ mm}$$

wherein $D_m$, W and $\rho$ are as defined above and/or for formula (1), the latter for PET being 1.38 g/cubic centimetre. The factor of 2 was simply taken instead of summing over k=1, 2 and over n=1, 2 as outlined for formula (1) because the two layered composites 7 in the double composite were identical to each other in every respect.

By using such distance $D_c$ the remaining air contained in the top layers 73 was expelled to the environment by the penetrating molten TPU.

An essentially gas-free sheet material of the invention, consisting of a non-woven fabric uniformly dispersed throughout the TPU, with a thickness $D_m$ of about 1.7 mm and a Shore D hardness of 50, was obtained.

Example 2: Manufacture of a Punching Belt 2 of the Invention

Reference is made to FIG. 2.

A sheet material of the invention 1, prepared as described in Example 1, was bonded to a customary traction layer 3 consisting of a woven fabric having a 2/1 twill weave, with PET multifilaments of about 1000 dtex as warp threads and nylon monofilaments with a diametre of about 0.3 mm as weft threads. The bonding was done on a customary calender using a thermosetting crosslinking polyurethane as adhesive 4.

Example 3: Comparative Endurance Test of a Prior Art Sheet Material and a Sheet Material of the Invention in Punching Application Reference is made to FIGS. 3-6.

Both an inventive sheet material, of similar construction as the one described with reference to Example 1 and a reference sheet material of the prior art (Habasit type XVT-2295) were tested.

Figure 3:
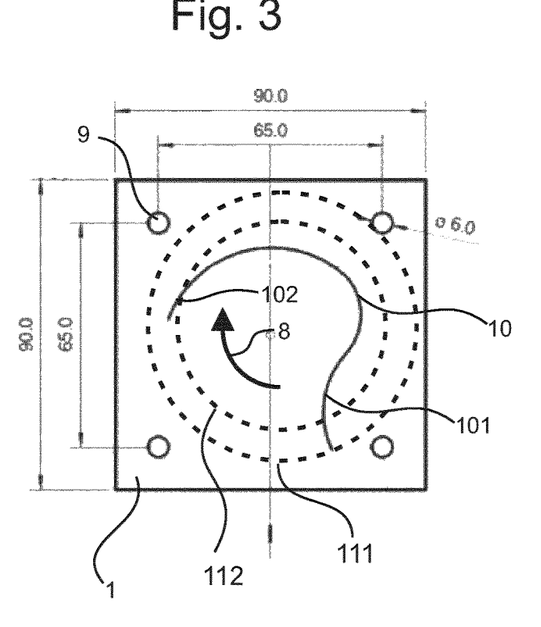
FIGS. 3 and 4 show details of an experimental setup for testing of sheet materials in a punching test.

For this test a laboratory press frame having a pressing piston rod, actuable in vertical direction by a pneumatic cylinder, and a rotatable support 8 was used (indicated in FIG. 3 with a circular arrow). The test sample was fixed to the rotatable support 8 using fixing screws 9. Onto the piston rod was fixed a curved knife 10 facing with its blade downwards towards the rotatable support 8. By the action of the pneumatic cylinder the knife 10 fixed to the piston rod could be moved downwards and pressed against the rotatable support 8 with a controllable pressure. For the test a pneumatic pressure of 6 bar was used in the cylinder. The curved knife 10 had (see FIGS. 3 and 4), when seen from the knife's rear edge to the cutting edge in a direction parallel to the blade surfaces, a curvature resembling a hook, with a overall length of the cutting edge of 220 mm. The start 101 of the cutting edge was about 110 mm away from the rotation centre of the rotatable support 8 and the end 102 was about 70 mm away from the rotation centre of the rotatable support 8. The curvature of the cutting edge near its end 102 was such that it was lying nearly on a circle with its centre coinciding with the rotation centre of the rotatable support 8, whereas towards its start 101 the curvature would steadily become nearly axial to the rotation centre of the rotatable support 8.

Figure 4:
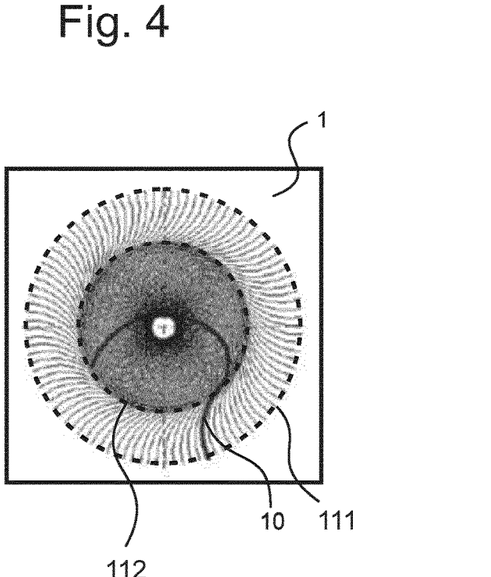

The test procedure for either a sample of the sheet material of the invention, 1, or of the reference sheet material, 1 ref, was as follows:

The sample, of approximately 90×90 mm surface, was mounted onto the rotatable support 8 at the corners of the sheet material using the four fixing screws 9.

The vertical displacement of the knife 10, by action of the piston rod/pneumatic cylinder, was adjusted such that a test paper of 80 g/square metre, lying on the sample fixed to the support 8, was just cleanly cut through by the curved knife 10. This necessitated a slight penetration of the knife 10 into the surface of the sample 1 or 1 ref.

With the vertical displacement of the knife so adjusted, 1000 press cuts were made with the knife 10 against the sample. After each press cut, the sample was rotated by an angle of 2-3.degrees using the rotatable support 8. This allowed to exert onto the sample different stamping densities SD, defined as $$SD = \frac{L \times N}{A}$$

wherein L is the length of the knife 10 (in metre), N is the number of press cuts (dimensionless), and A is the surface of the sheet material surface undergoing the press cuts (in square metres). SD thus has the unit 1/metre. The said different stamping densities would be arranged, by virtue of the orientation and curvature of the curved knife 10 and the rotation of the rotatable support 8 after each press cut, on concentric circles, with their centres coinciding with the centre of rotation of the rotatable support 8.

After 1000 press cuts the vertical displacement of the curved knife 10 was again adjusted using a sheet of paper of 80 g/square metre, as described above, and a further 1000 press cuts were made against the sample.

Figure 5:
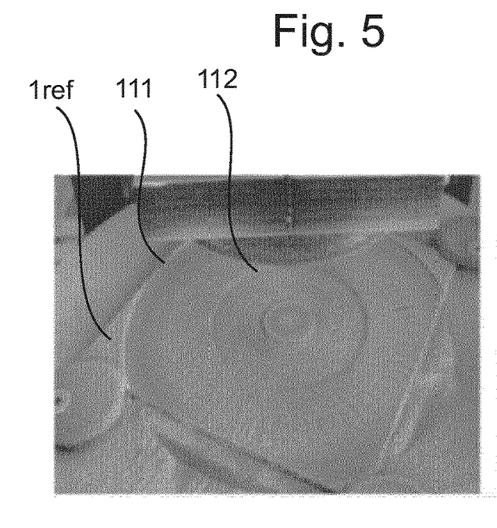
FIGS. 5 and 6 show surfaces of a reference sheet material and an inventive sheet material after having performed a punching test.
Figure 6:
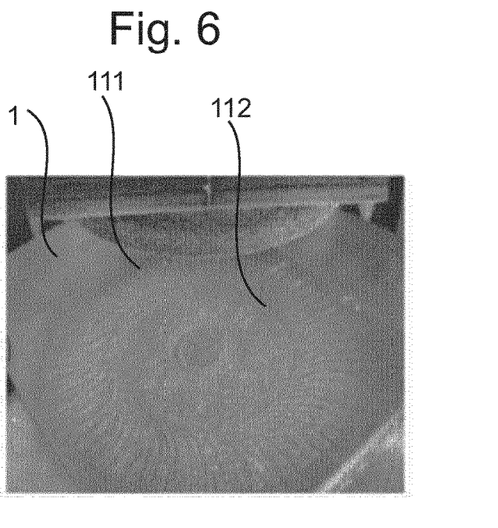

The surface of the sample penetrated by the curved knife 10 was then photographed. The photograph of the sample of reference sheet material, 1 ref, is shown in FIG. 5 and the photograph of the sample of inventive sheet material, 1, in FIG. 6. These photographs show that the reference sheet material 1 ref reacts more sensibly to variations in the above defined stamping density SD than the inventive sheet material 1: It shows two circular recesses, indicative of irreversible material loss. The first recess, delimited by the annular border 111, represents the perimeter within which the curved knife 10 was exerting cutting action onto the sheet material (outside this first perimeter the sheet material never came into contact with the cutting edge of the curved knife 10). The second, more pronounced circular recess is delimited by the annular border 112 and is due to the fact that within this second perimeter the curved knife 10 exerted the highest stamping density SD because here the curvature of the curved knife 10 would run essentially nearly a circle with its centre coinciding with the rotation centre of the rotatable support 8 (see above), resulting in a long section of the cutting edge of the curved knife 10 cutting into a rather narrow axial section of the sheet material. The sheet material of the invention exhibited less material losses but rather showed an increased unevenness of the surface. This unevenness is however fully reversible using the regeneration process described hereinabove in the general part.

Example 4: Comparative Endurance Field Test of a Prior Art Punching Tape and a Punching Tape of the Invention in Punching Application An inventive punching tape, of similar construction as the one described with reference to Example 2, was tested.

The field test was performed on a punching press located at an automotive parts producer. This punching press punched blanks for the manufacture of automotive heat shields out of an aluminum sheet of 0.7 mm thickness. The punching press had a cutting die in the form of a serrated blade. The test ran successfully for a full three years (2011-2014).

The invention claimed is:

1. A sheet material consisting of a mixture consisting essentially of:
   a) 10-50 percent by weight of random-oriented fibres, and
   b) 90-50 percent by weight of a thermoplastic or thermoplastic elastomer;
the weight percentages being based on the mixture; characterised in that the sheet material has at room temperature a Shore D hardness of 40 to 60 and in that in the mixture the fibres a) are uniformly distributed through the thermoplastic or thermoplastic elastomer b).

2. The sheet material of claim 1, characterised in that it has a residual gas content of essentially zero.

3. The sheet material of claim 1, characterised in that the fibres a) are organic fibres.

4. The sheet material of claim 3, characterised in that the organic fibres are natural fibres.

5. The sheet material of claim 4, characterised in that the natural fibres are vegetal fibres selected from the group consisting of cellulose, hemp, flax, ramie, sisal, cotton and jute; or are animal fibres selected from the group consisting of wool and silk.

6. The sheet material of claim 3, characterised in that the organic fibres are synthetic fibres selected from the group consisting of polyesters, polyamides, polyacrylonitrile; polyolefinic fibres, aramid and synthetic cellulose derivatives, or are bicomponent fibres.

7. The sheet material of claim 6, characterised in that the synthetic fibres are of polyethylene terephthalate, polybutylene terephthalate, nylon, polyacrylonitrile, aramid, polyethylene or polypropylene, or are bicomponent fibres.

8. The sheet material of claim 1, characterised in that the fibres are inorganic fibres selected from the group consisting of glass, asbestos and carbon, or are metal fibres.

9. The sheet material of claim 1, characterised in that the length of the fibres is in the range of 15 to 150 mm.

10. The sheet of claim 1, characterised in that the mixture contains 50 to 90 percent by weight of a thermoplastic or thermoplastic elastomer selected from the group consisting of i) styrenic block copolymers, ii) thermoplastic (co)polyolefins and blends thereof, iii) elastomeric alloys, iv) thermoplastic polyurethanes, v) thermoplastic copolyesters and vi) thermoplastic polyamides.

11. The sheet material of claim 10, characterised in that the thermoplastic is polyvinyl chloride or the thermoplastic elastomer is thermoplastic polyurethane.

12. A process for the manufacture of a sheet material of claim 1, comprising the steps of
  i) providing two layered composites, each layered composite comprising or consisting essentially of a top layer consisting essentially of a pre-assembled sheet fibre layer with random orientation of the fibres, a bottom layer consisting essentially of a sheet of a thermoplastic or thermoplastic elastomer, and an optional intermediate layer consisting essentially of the fibres of the top layer impregnated with the thermoplastic or thermoplastic elastomer of the bottom layer; wherein the thermoplastic or thermoplastic elastomer in the bottom layer and in the optional intermediate layer has a Shore A hardness in the range of 85 to 100 and makes up 90-50 percent by weight of the layered composite; and the fibres of the top layer and in the optional intermediate layer together make up 10-50 percent by weight of the layered composite;
  ii) stacking the two layered composites atop of each other such that their bottom layers contact each other and their top layers face away from each other; and
  iii) bonding the two layered composites together by heat and pressure at a temperature at which the thermoplastic or thermoplastic elastomer melts and penetrates into the two top layers, to form the sheet material of the invention.

13. A punching tape comprising a sheet material as defined in claim 1 as a top layer, and an underlying traction layer.

14. A process for punching or cutting a section out of a sheet workpiece, comprising the steps of
  a) arranging the sheet workpiece on the sheet material as the top layer according to claim 13; such that the top layer acts as a support for the sheet workpiece; and
  b1) punching the section out of the sheet workpiece using a punch, or
  b2) cutting the section out of the sheet workpiece using a knife or blade.

15. A process for punching or cutting a section out of a sheet workpiece, comprising the steps of
  a) arranging the sheet workpiece on a sheet material according to claim 1, such that the sheet material acts as a support for the sheet workpiece; and
  b1) punching the section out of the sheet workpiece using a punch, or
  b2) cutting the section out of the sheet workpiece using a knife or blade.

* * * * *